US010339313B2

(12) United States Patent
Giuliani et al.

(10) Patent No.: US 10,339,313 B2
(45) Date of Patent: Jul. 2, 2019

(54) SYSTEM AND METHOD FOR BYPASSING A MALWARE INFECTED DRIVER (71) Applicant: Webroot Inc., Broomfield, CO (US)

(72) Inventors: Marco Giuliani, Bastia Umbra (IT); Andrea Allievi, Giussano (IT)

(73) Assignee: WEBROOT INC., Broomfield, CO (US)

( * ) Notice: Subject to any disclaimer, the term of this patent is extended or adjusted under 35 U.S.C. 154(b) by 16 days.

(21) Appl. No.: 14/331,920

(22) Filed: Jul. 15, 2014

(65) Prior Publication Data
US 2015/0020202 A1    Jan. 15, 2015

Related U.S. Application Data (60) Provisional application No. 61/846,554, filed on Jul. 15, 2013.

(51) Int. Cl.
*G06F 21/56* (2013.01)
*H04L 29/06* (2006.01)

(52) U.S. Cl.
CPC .......... *G06F 21/566* (2013.01); *G06F 21/568* (2013.01); *H04L 63/18* (2013.01); *H04L 63/145* (2013.01)

(58) Field of Classification Search
CPC ............................... G06F 21/56; G06F 21/566
See application file for complete search history.

(56) References Cited

U.S. PATENT DOCUMENTS

| 2003/0009692 | A1* | 1/2003 | Smith ..................... G06F 21/55 726/4 |
| 2007/0078915 | A1* | 4/2007 | Gassoway ............. G06F 21/562 |
| 2007/0079178 | A1* | 4/2007 | Gassoway ............. G06F 21/566 714/38.14 |
| 2009/0307193 | A1* | 12/2009 | Ganjikunta ......... G06F 11/3688 |
| 2011/0035808 | A1* | 2/2011 | Butler ................... G06F 21/575 726/27 |

(Continued)

OTHER PUBLICATIONS

Bridget Flatley, "Rootkit Detection Using a Cross-View Clean Boot Method", Air Force Institute of Technology, Department of Air Force Air University, Published Mar. 2013. (Year: 2013).*

(Continued)

*Primary Examiner* — Chau Le
(74) *Attorney, Agent, or Firm* — Merchant & Gould P.C.

(57) ABSTRACT

Aspects of the present disclosure relate to setting up an alternate communication path to a device, resource, file, etc., in order to avoid a potentially infected driver. New drivers may be established as part of the alternate communications path, thereby providing access to a device, resource, etc. using drivers that are known to be clean or, in other words, not infected by a rootkit. In doing so, a rootkit hunter, e.g., antivirus software, antimalware software, etc., may access an infected device, resource, etc. without alerting a rootkit, thereby avoiding activation of the rootkit's defensive mechanisms. In one aspect, an I/O request may be serviced by using the new communications path bypassing any potentially infected drivers while another request may be serviced using a previously established communications path. The responses (e.g., data returned, action performed, etc.) of the requests may then be compared.

20 Claims, 5 Drawing Sheets

(56) References Cited

U.S. PATENT DOCUMENTS

| | | | |
|---|---|---|---|
| 2011/0289600 A1* | 11/2011 | Rusakov | G06F 21/55 726/30 |
| 2013/0111211 A1* | 5/2013 | Winslow | H04L 9/3234 713/171 |
| 2013/0247186 A1* | 9/2013 | LeMasters | G06F 21/572 726/22 |
| 2013/0347131 A1* | 12/2013 | Mooring | G06F 9/45558 726/29 |
| 2014/0215196 A1* | 7/2014 | Berlin | G06F 21/572 713/2 |
| 2016/0099960 A1* | 4/2016 | Gerritz | H04L 63/145 726/23 |
| 2016/0248590 A1* | 8/2016 | Benson | G06F 21/53 |

OTHER PUBLICATIONS

Shevchenko et al. (2009) Virus Bulletin 6-9 "Everybody lies: reaching after the truth while searching for rootkits".

\* cited by examiner

SYSTEM AND METHOD FOR BYPASSING A MALWARE INFECTED DRIVER

PRIORITY

This application claims the benefit of U.S. Provisional Application No. 61/846,554, filed on Jul. 15, 2013, which is hereby incorporated by reference in its entirety.

BACKGROUND

Rootkits are a type of malware that tend to be extremely stealthy. This is due to the fact that rootkits often are designed to hide the existence of certain processes or programs from normal methods of detection. Rootkits often target drivers. Most operating systems support kernel-mode device drivers, which generally execute with the same privileges as the operating system itself. As such, many kernel-mode rootkits are developed as device drivers or loadable modules and, when operating, have unrestricted access to resources and data. Moreover, some rootkits operate to replace a portion of systems Master Boot Record (MBR). In doing so, the rootkit may be able to store data that is required to survive reboots in physical sectors instead of files. As such a rootkit may remain hidden from a security application, such as antivirus and antimalware software. In some instances, the rootkit may only need to hook an input/output (I/O) disk driver to hide and protect the modified portion of the MBR. Thus, rootkit detection is difficult because a rootkit may be able to hide its existence by returning clean copies of selected data to a antivirus application, thereby making the detection and removal process extremely complicated and/or practically impossible. It is with respect to this general environment that aspects of the present technology disclosed herein have been contemplated.

SUMMARY

Aspects of the present disclosure leverage the fact that most rootkits attempt to impede security products by using watchdog techniques. Therefore, aspects of the present disclosure may create a separate driver and/or driver chain to access resources and/or data (e.g., hardware and/or software) in which the rootkit currently resides. Watchdog techniques monitor requests for a resource or data that are infected by a rootkit and mask the presence of the rootkit or provide the ability to reinstall the rootkit in the event that the rootkit is detected and removed. As such, a rootkits generally have defense mechanisms in place to detect when a rootkit hunter (e.g., antivirus software, antimalware software, etc.) attempts to remove a set of rootkit hooks from a hooked or infected file and/or memory associated with the hooked and/or infected file. In response to detecting a threat, the rootkit may hide its existence, use kernel access to shut a rootkit hunter down, and/or reinstall itself in the event that it is detected and removed. For example, a rootkit having one or more hooks in an I/O driver chain may monitor all I/O requests redirect, filter, and/or modify or otherwise compromise any I/O requests directed toward a file or device infected with the rootkit. To circumvent such defenses, aspects of the present disclosure load a separate driver and/or driver chain and communicate directly with the resource, file, and/or device using the newly loaded driver and/or driver chain. In so doing, any attempt to detect a rootkit, or a portion of a rootkit residing on a device, is passed through the newly loaded driver/driver chain, which avoids potentially infected drivers, thereby avoiding detection by a rootkit's defense mechanisms.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Aspects of the present disclosure relate to systems and methods for the detection and removal rootkits. A rootkit is a malicious piece of code or software that infects a computer or device in order to provide unauthorized access to device resources and/or data. Rootkits may be malicious code that has privileged access in a computing system. For example, a rootkit may have root or administrator access. As such, rootkits may exert full control over a computing system and/or individual computing components. Such privileged access may make it difficult to identify and/or remove a rootkit. Rootkits may leverage the privileged access to employ defensive and/or stealth capabilities that are used to avoid detection and/or subvert countermeasures employed by protection software (e.g., antivirus software, antimalware software, etc.). One defensive mechanism employed by rootkits is hooking (or infecting) a device driver. Once the rootkit infects the device driver, the rootkit may be able to monitor requests made to the device and identify any requests that may be intended to detect and/or remove malicious software. Upon controlling the driver, the rootkit may be able to subvert requests that may lead to its detection. For example, in response to request to read data from a sector of a disk infected by the rootkit, the rootkit may return a clean copy of the data (e.g., a copy of the data that does not include the rootkit code). As such, any attempts to detect the rootkit may be subverted. Additionally, the rootkit may be able to store a copy that can be used to reinstall the rootkit if it is detected.

Aspects of the present disclosure relate to setting up an alternate communication path to a device, resource, file, etc., in order to avoid a potentially infected driver. New drivers may be established as part of the alternate communications path, thereby providing access to a device, resource, etc. using drivers that are known to be clean or, in other words, not infected by a rootkit. In doing so, a rootkit hunter, e.g., antivirus software, antimalware software, etc., may access an infected device, resource, etc. without alerting a rootkit, thereby avoiding activation of the rootkit's defensive mechanisms. In one aspect, an I/O request may be serviced by using the new communications path bypassing any potentially infected drivers while another request may be serviced using a previously established communications path. The responses (e.g., data returned, action performed, etc.) of the requests may then be compared. If the responses differ, there may be a chance that the existing communications path is infected by a rootkit. Upon detection of the rootkit, a countermeasure may be employed. In one aspect, the countermeasure may be overwriting the resource and/or previously established driver using the new communication pathway. In another aspect, the countermeasure may be directing all requests to a device or resource through the alternate communication pathway. While specific countermeasures are described, one of skill in the art will appreciate that any type of countermeasure may be employed without departing from the scope of this disclosure.

Figure 1:
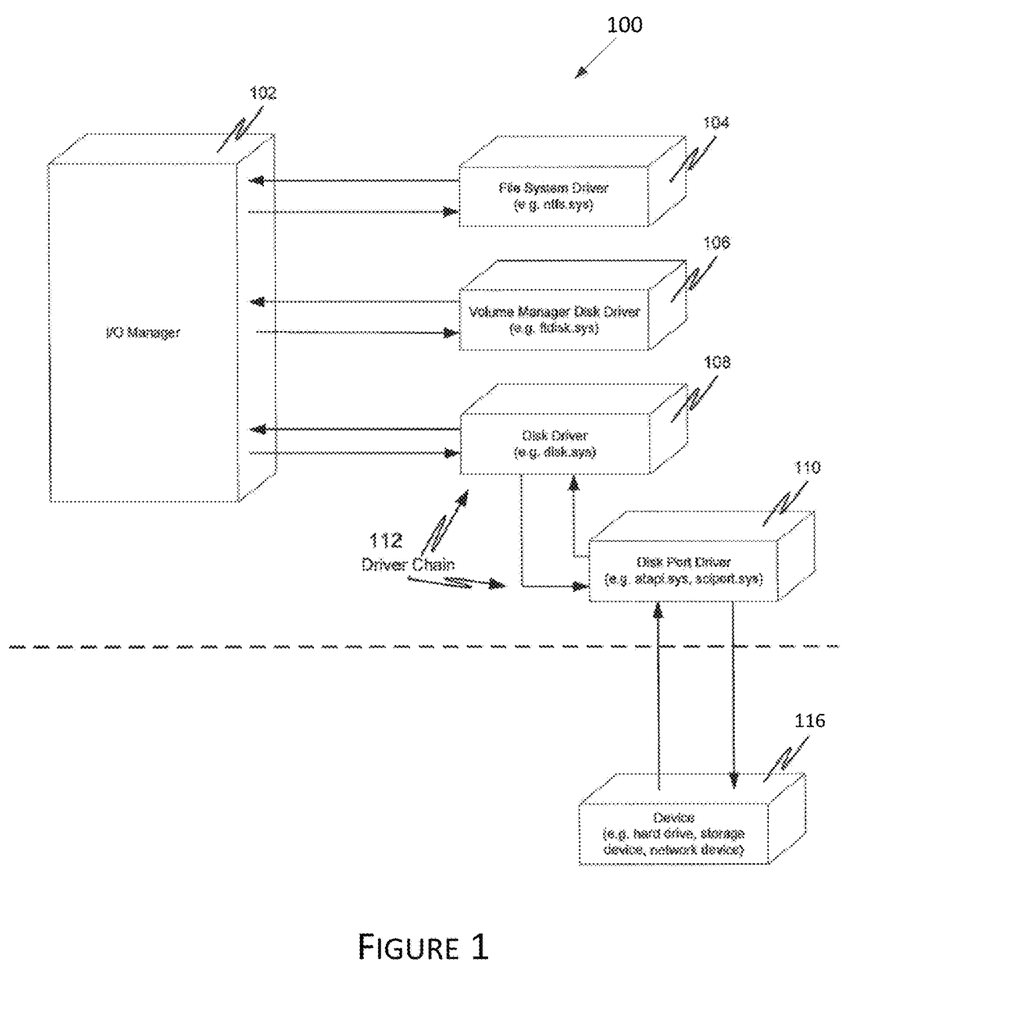
FIG. 1 illustrates an exemplary I/O system 100 that may be employed by a computing device.

FIG. 1 illustrates an exemplary I/O system 100 that may be employed by a computing device. The exemplary I/O system includes various components (e.g., drivers, communications paths, etc.) that may be targeted by a rootkit. In the exemplary embodiment, the I/O driver stack architecture is layered providing third party hardware manufacturers with the ability to insert hardware drivers within already existing layers, thereby utilizing existing functionality provided by an operating system without requiring the hardware manufacturers to duplicate functionality provided by an operating system. However, the layered architecture also creates an opportunity for rootkit authors to inject their malicious code to interrupt the flow of and/or otherwise compromise I/O requests, (e.g., I/O Request Packets) and perform malicious activities such as, for example, keystroke logging, filtering I/O requests and/or data from and/or to storage devices, altering installed applications, and/or subverting defensive software employed by the computing device, such as antivirus and antimalware applications. In doing so, rootkits may hook (e.g., infect) drivers, patch driver routines, and/or even create an entirely new driver and insert it into a driver stack. As shown in FIG. 1, a representative example of an I/O system includes an I/O manager 102, a file system driver 104, a volume manager disk driver 106, and/or a driver chain 112 comprising a disk driver 108 and a disk port driver 110. The driver chain 112 provides functionality that allows the 10 system to communicate with the device 116. The driver chain 112 may include one or more drivers capable of accessing and/or manipulating device 116. In one aspect, access to a resource may be through multiple drivers, such as the exemplary disk driver 108 and the disk port driver 110. Exemplary drivers include, but are not limited to the disk.sys driver, the atapi.sys driver, the sciport.sys driver, etc. One of skill in the art will appreciate that any type of driver may be employed with the aspects disclosed herein without departing from the scope or spirit of this disclosure.

The device 116 may comprise a hard drive, any storage device, a network device, a keyboard, and/or any other device that may interact with a system. While specific components are illustrated in the exemplary I/O system 100, one of skill in the art will appreciate that other I/O systems may include additional or fewer components and that the exemplary I/O system 100 is provided for illustrative purposes. As such, the aspects disclosed herein may be practicee with different I/O systems without departing from the spirit or scope of this disclosure.

Figure 2:
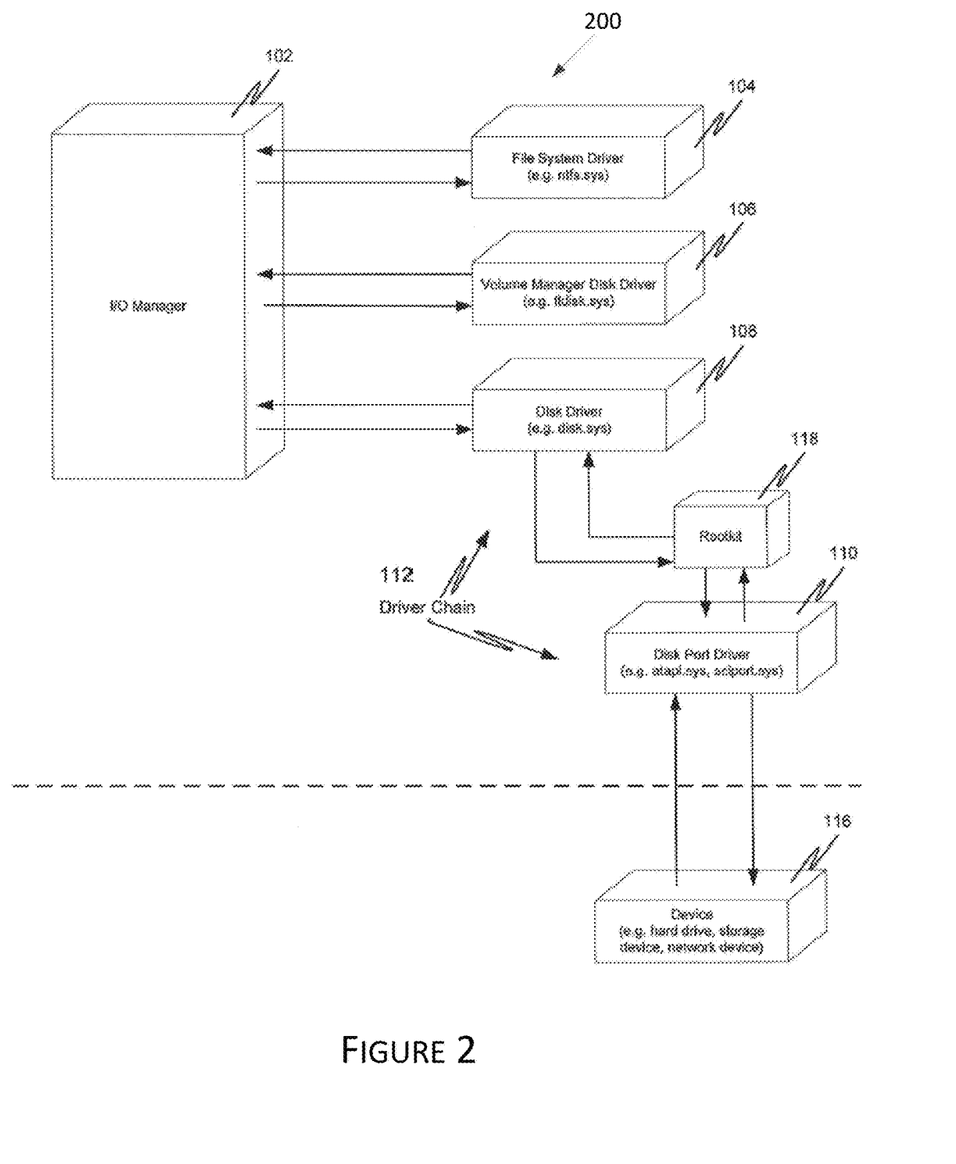
FIG. 2 illustrates and exemplary compromised system 200 that has been infected with a rootkit.

FIG. 2 illustrates and exemplary compromised system 200 that has been infected with a rootkit. As depicted in FIG. 2, a rootkit 118 may hook or infect a device driver, such as the loaded disk driver 108, and intercept I/O requests and/or I/O resource packets traveling to and from the device 116 via the disk port driver 110. That is, the rootkit 118 may alter the driver's 108 function pointers and redirect them to a malicious function associated with the rootkit 118. This is also known as IRP hooking. As previously discussed, a rootkit 118 may also completely remove an existing driver, such as driver 108, and insert its own driver into the driver chain 112. By hooking or replacing driver 108, the rootkit 118 may gain the ability to monitor I/O requests submitted to the driver 108. Furthermore, the rootkit 118 may intercept I/O request packets and modify the content of the packets in order to hide its existence. An I/O request packet may include data related to the I/O request, a message or indication that an action has been performed, or any other type of information associated with an I/O request.

As illustrated in FIG. 2, hooking or replacement of the driver 108 provides the rootkit 118 with unrestricted access to the device 116 in communication with the driver 108. As such, the rootkit is able to perform malicious actions on device 116 such as, for example, accessing unauthorized data, tracking usage, instructing device 116 to perform unauthorized actions, etc. Furthermore, control of the driver 108 allows the rootkit 118 to identify, intercept, and/or subvert attempts at detection and/or deployment of countermeasures by security software. As such, hooking or replacing the driver 108 may provide the rootkit 118 unfettered access to device 116 and any resources associated with the device 116.

Figure 3:
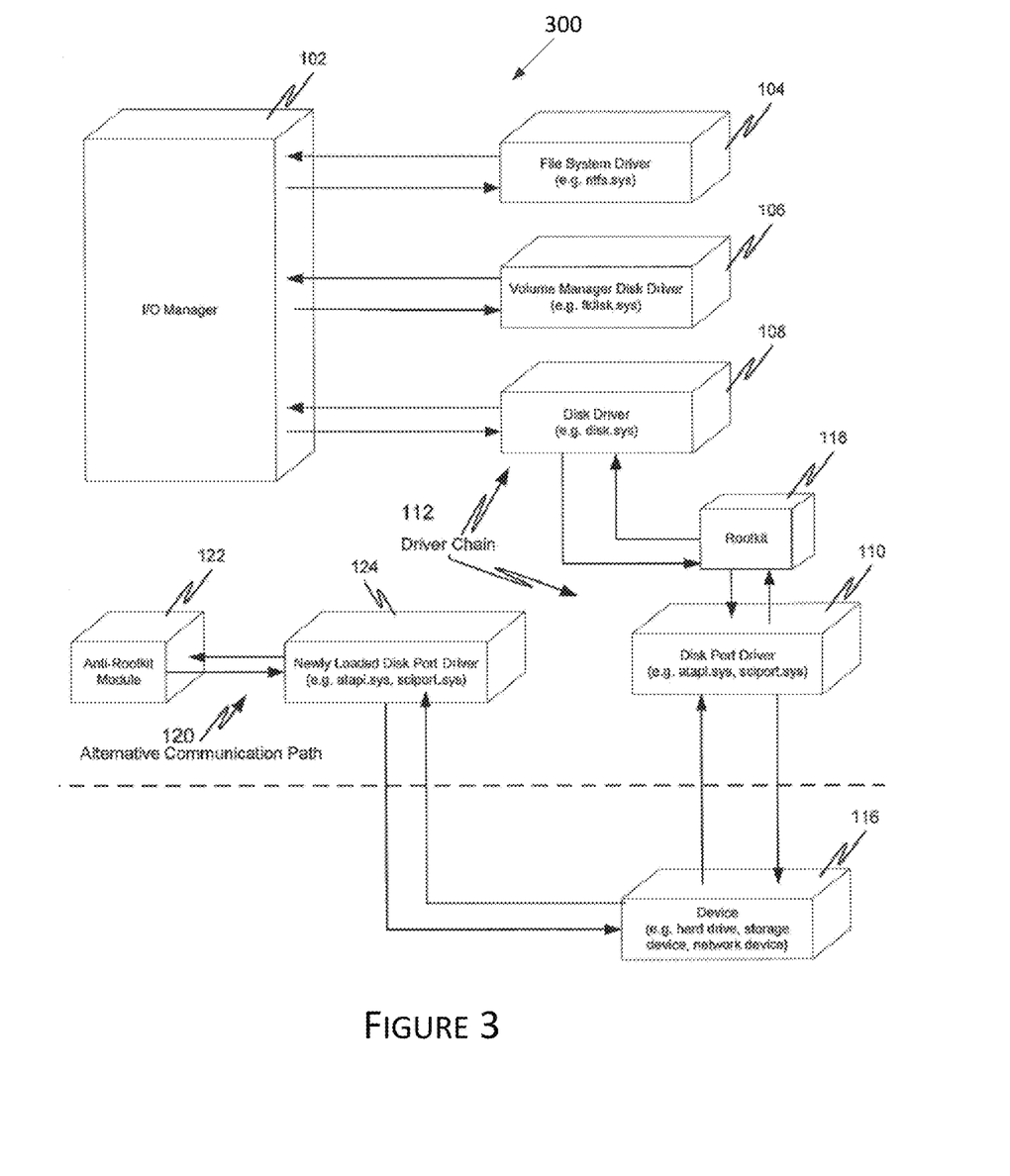
FIG. 3 illustrates an exemplary system 300 for detecting and/or deploying countermeasures against a rootkit.

FIG. 3 illustrates an exemplary system 300 for detecting and/or deploying countermeasures against a rootkit. As previously discussed, by hooking into driver 108, rootkit 118 has the ability to identify and subvert attempts to detect and remove the malicious software. In order to avoid detection, an alternate communication path 120 may be established with a device. The alternate communication path 120 may be used to service I/O requests made by an anti-rootkit module 122 (e.g., antivirus software, antimalware software, etc.). In one aspect, anti-rootkit module 122 may determine a lowest level driver, such as the disk port driver 110, in the driver chain 112. If a driver other than the lowest level driver is used by anti-rootkit module 122, any rootkits that are hooked to lower level drivers may employ defense mechanism to avoid detection by the anti-root kit module 122. The anti-rootkit module 122 may then analyze the lowest level driver's structure and dependencies and further determine a location of the file corresponding to the lowest level driver. The location for the file may be stored on a local device or accessed and downloaded using a network. For example, if the lowest level driver installed is disk port driver 110 and the corresponding loaded file is atapi.sys, the anti-rootkit module 122 may locate a clean copy of the atapi.sys file on the system or on a network. Once the clean copy of the lowest level driver is located, it is loaded into memory as a separate module; and the anti-rootkit module 122 communicates directly with the newly loaded driver 124 instead of passing through the classic disk I/O chain 112 which is hooked by the rootkit. The anti-rootkit module 122, communicating directly with the new lowest level driver 124, may then perform some action, such as removing the rootkit 118, and/or cleaning the system's MBR.

The newly loaded driver 124 may be loaded into a private memory location that is not accessible to rootkit 118. This may ensure that rootkit 118 does not detect the existence of the newly loaded driver 124 and/or ensures that any countermeasures performed by the anti-rootkit module 122 cannot be subverted by the rootkit 118. In order to detect the existence of rootkit 118, the anti-rootkit module 122 may issue an I/O request to device 116 via the alternate communication path. The same or similar I/O request may also be issued via the previously established communication path (driver chain 112). The I/O request may be for data (e.g., to read a sector of a disk, to read memory, etc.) or to perform an action (e.g., communicate with another device, transfer data, print, etc.). Upon issuing the I/O requests, the anti-rootkit module 112 receives a response via each of (a) the alternate communication path 120 and (b) the driver chain 112. For example, if the I/O request was for data, each response may contain the requested data. Anti-rootkit module 122 may compare the I/O responses received via alternate communication path 120, which is known to be secure, and via driver chain 112. Based upon the comparison, the anti-rootkit module 122 may identify the existence of the rootkit 118. For example, if a discrepancy exits between the two I/O responses, a rootkit likely exists somewhere in driver chain 112. Upon detecting the discrepancy, anti-rootkit module 122 may employ countermeasures. In one aspect, the countermeasure may redirect all I/O call to device 116 through alternate communication path 120. The alternate communications path 120 may be established in private memory that the components of the driver chain 112 do not have access to. As such, by redirecting the communications through the alternate communication path 120, the rootkit 118 continues to operate as if it was not detected because the rootkit 118 does not have the ability to detect the alternate communications path. Additionally, because I/O requests are no longer transmitted via driver chain 112, the rootkit 118 may not be able to intercept any data and/or perform malicious actions on the I/O requests.

In another aspect, the countermeasure deployed by anti-rootkit module 122 may be the removal of rootkit 118. As previously discussed, rootkit 118 may be capable of hiding its existence and/or subverting any attempts to remove the rootkit by virtue of the control provided by hooking or infecting a driver. In doing so, rootkit 118 may manipulate data returned in I/O responses to hide the existence of malicious code. One common tactic employed by rootkits is to return clean data in I/O responses (e.g., disk data without the malicious code). Often, rootkits will return a copy of the requested data as it existed before installation of the infected code. As such, an I/O response returned from a rootkit infected communication path (e.g., driver chain 112) may contain a clean copy of requested data or a version of the data as it existed prior to infection. The anti-rootkit module 122 may take the I/O response from the rootkit infected communication path use it to overwrite the data on the disk. However, the I/O response returned via the alternate communication path 120 may not be cleaned to hide the existence of malicious code. Thus, differences between the I/O responses received via the alternate communication path 120 and the driver chain 112 indicates that one or more rootkits may be present in the driver chain. Differences may also indicate the presence of malicious code on device 114.

Furthermore, as a countermeasure an I/O request to overwrite the data on the disk may be made. The I/O request to request to overwrite the data on the disk may be submitted and/or performed using alternate communication path 120, thereby avoiding detection by rootkit 118. In doing so, rootkit 118 may not be able to employ any defensive mechanisms (e.g., intercepting the request, copying malicious code to another location in memory, etc.). In doing so, the anti-rootkit module 112 may use the modified I/O response from driver chain 112 to copy over the infected locations in memory, thereby restoring the computing system to its state prior to infection by the rootkit 118.

Figure 4:
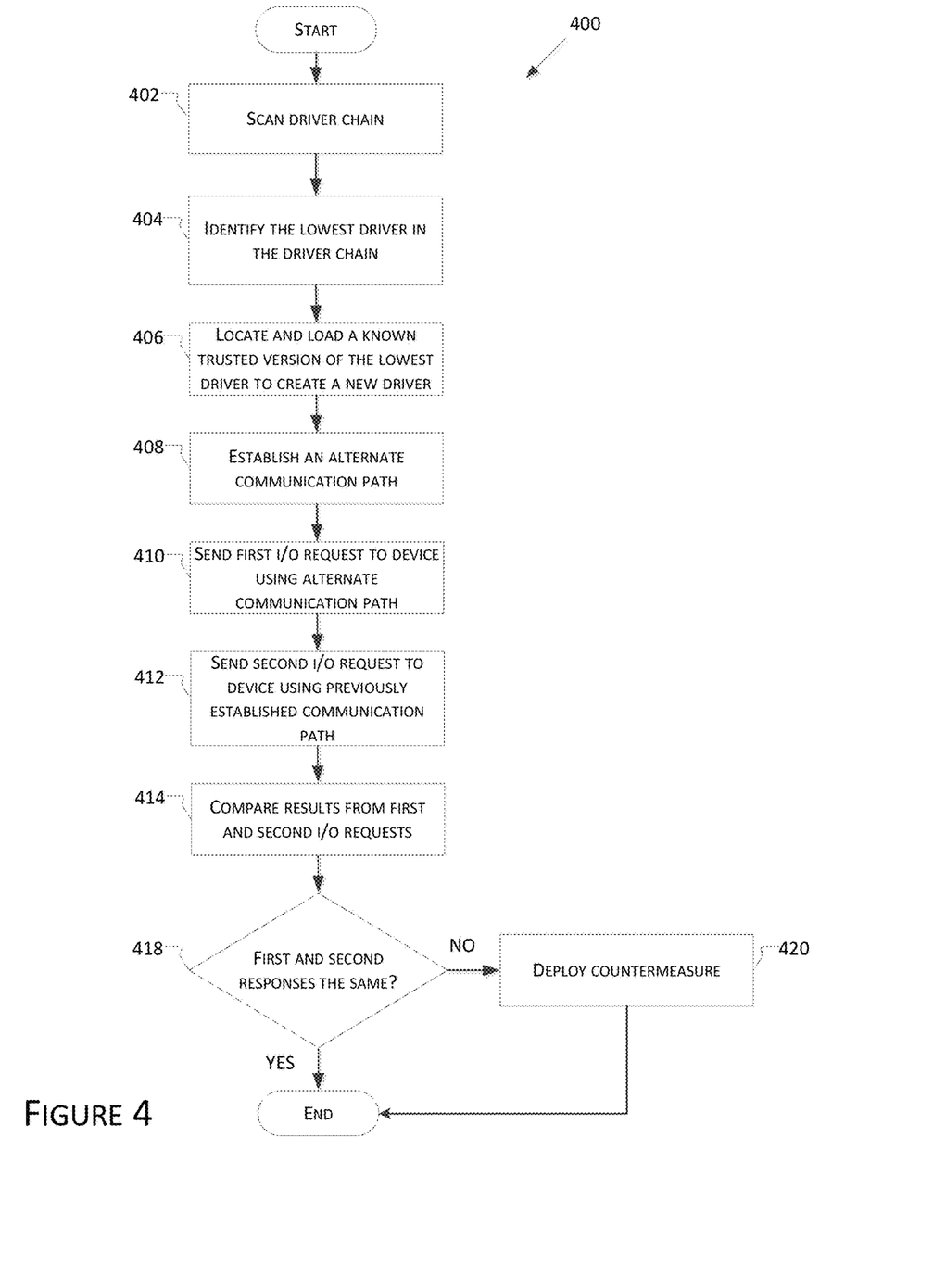
FIG. 4 illustrates an exemplary method 400 for bypassing a malware infected driver.

FIG. 4 illustrates an exemplary method 400 for bypassing a malware infected driver. The method 400 may be performed by an anti-rootkit module, such as anti-rootkit module 122, antivirus software, antimalware software, an operating system, or any other type or security related application. Additionally, the method 400 may be implemented in software (e.g., though execution of computer-executable instructions by a processor), implemented in hardware, or implemented as a combination of hardware and software. Flow begins at operation 402 where a driver chain is scanned. Scanning the driver chain may include identifying one or more drivers in a communication path. After scanning the driver chain and identifying drivers in a communication path, flow continues to operation 404 where the lowest driver in the driver chain is identified. A driver architecture may include multiple levels of drivers. The lowest level driver may be the last driver in the driver chain. In other words, the lowest level driver may directly access or interface a device or storage. Identifying the lowest level driver in a driver chain enables direct access to a device or storage, which, in turn, ensures that there are not hooked drivers lower on the driver chain, thereby avoiding activation of any rootkit defensive mechanisms when searching for and/or deploying countermeasures against one or more rootkits. In embodiments, identifying the lowest driver in a driver chain may include identifying a copy of the driver. The copy of the driver may be stored locally or may be available on a network. For example, identifying a lowest level diver may include identifying a driver by name (e.g., disk.sys, atapi.sys, etc.) and/or a location of a clean copy of the driver.

Upon identifying the lowest driver in the driver chain, flow continues to operation 406 where a known and trusted copy of the identified driver is loaded. The new driver loaded at operation 406 may be the same type of driver as the lowest level driver identified at operation 404. However, the driver loaded at operation 406 may be a known and/or trusted copy of the driver. In other words, the new driver loaded at operation 406 is a clean driver that has not been infected by a rootkit. In one aspect, the new driver loaded at operation 406 is loaded into a private or secure part of memory. The private or secure part of memory may be memory that is not shared with or not accessible to drivers in the existing driver chain. Loading the new driver into secure memory may ensure that any rootkits that may reside in the existing driver chain cannot detect the existence of the newly loaded driver.

Flow continues to operation 408 where an alternate communication path is established. The alternate communication path may provide an alternate means of submitting I/O requests or otherwise connecting to a device or storage. Because the new device is known to be clean, the alternate communication path is known to be free of malicious code. As such, responses to I/O requests returned using the alternate communication path are trusted. In other words, any data or information returned in response to an I/O request is known to be accurate and unmodified. In addition to loading the new lowest level driver, establishing the alternate communication path may also include loading one or more additional drivers. For example, establishing the alternate communication path may include loading new copies of some or all of the other drivers that are part of an existing communication path in addition to the lowest level driver.

Upon establishment of the alternate communication path, flow continues to operation 410 where a first I/O request is sent to the device via the alternate communication path. The first I/O request may be a request to read data from a specific location in storage (e.g., a hard drive, a solid state drive, etc.) or memory. Other aspects of the disclosure envision communication with devices other than storage devices (e.g., printers, routers, mobile device connected via a network, speakers, etc.). In such aspects, the I/O request may be a command instructing the device to perform a specific action (e.g., print a document, play an audio file, transfer data, etc.). In response to submitting the first I/O request, a response may be returned via the alternate communication path. The response may be the requested data, for example, if the I/O request was a request for data on a storage device, an indication that a specific action has been performed by the device, or any other type of response related to an I/O request.

Flow continues to operation 412 were a second I/O request is to a device using the previously established communication path. Similar to the first I/O request described above, the second I/O request may be a request to read data from a specific location in storage (e.g., a hard drive, a solid state drive, etc.) or memory. Other aspects of the disclosure envision communication with devices other than storage devices (e.g., printers, routers, mobile device connected via a network, speakers, etc.). In such aspects, the I/O request may be a command instructing the device to perform a specific action (e.g., print a document, play an audio file, transfer data, etc.). In response to submitting the second I/O request, a second response may be returned via the existing, previously established path (i.e., not the alternate communication path). The second response may be the requested data, for example, if the I/O request was a request for data on a storage device, an indication that a specific action has been performed by the device, or any other type of response related to an I/O request. The second I/O request may be identical to the first I/O request. The first and second I/O requests may be submitted in parallel or sequentially in any order.

Upon receiving responses to the first and second I/O requests, flow continues operation 414 where the responses are compared. Comparing the different I/O responses may comprise examining the actual data returned by each I/O response. For example, the data may be examined and compared bit-by-bit, byte-by-byte, block-by-block, etc. Additionally or alternately, comparing the responses may comprise determining a signature or a hash for each response and then comparing the signatures and/or hashes to identify any discrepancies.

Flow continues to determination operation 418 where, based upon the comparison performed at operation 414, a determination is made as to whether any discrepancies exist between the two responses. In one aspect, only certain types of discrepancies may be identified. For example, some discrepancies in the responses may exist that may not be due to the existence of a rootkit (e.g., different headers that result from submitting the requests to different paths, different locations or location identifiers, etc.). Such discrepancies may have no relationship to the existence or non-existence of a rootkit or malicious code. Therefore, in some aspects of the present disclosure, such discrepancies may not be identified and/or may be disregarded at operation 418. In some aspects, discrepancies in the data returned in the response may indicate the existence of a rootkit and/or malicious code. For example, the rootkit may modify an I/O request to hide the existence of malicious code on a disk. In such circumstances, the underlying data returned by the rootkit infected drive chain may not include the malicious code while the response from the alternate communication path may include the code. Thus, differences in the content of the two responses may indicate the existence of a rootkit and/or malicious code. If no discrepancies exist between the responses, then the responses are the same and the existing communication path is not infected. As such, flow branches YES from operation 418 and the method 400 terminates. In an alternate embodiment, rather than immediately terminating, the method 400 may be performed on different driver chains in a computing environment or it may be performed again on the same driver chain.

Returning to decision operation 418, if discrepancies between the responses are identified and/or determined to be material, then a determination is made that the previously established driver chain is infected by one or more rootkits. Flow then branches YES to operation 420 where one or more countermeasures are executed. One countermeasure may be rerouting all requests to the device over the alternate communication path. Another potential countermeasure may be the deletion and reinstallation of one or more components of the previously established communication path. For example, one or more of the drivers in the previously established communication path may be replaced by copies that are known to be clean (e.g., free of rootkits). Alternately, as previously discussed, rootkits often hide their existence by returning a copy of data resident in a specific location of memory, sector of a hard disk, etc., as it existed prior to the installation of malicious code. Doing so hides the existence of the malicious code by essentially providing a backup of the memory location before the malicious code was installed. As such, the response returned by the rootkit may be a clean copy of data as it existed prior to installation of malicious code. Thus, the data from the response returned from the existing communication path may be used to overwrite the corrupted data (e.g., data that includes malicious code) on the device. The request to overwrite the device with the data from the response returned from the existing communication path may be submitted using the alternate data path, thereby avoiding detection by any rootkit infected driver(s) in the existing driver chain.

Countermeasures that involve the deletion or overwriting of infected memory locations may be performed using the alternate communications path. By using the alternate communication path, any rootkits that exist in the previously established communication path will not be able to detect the countermeasure and employ a defensive mechanism.

The systems and methods disclosed herein provide for reliably bypassing infected drivers to detect and/or replace rootkits. As such, the defensive mechanisms deployed by many different rootkits, which rely on control of a driver by the rootkit, cannot be effectively deployed. Therefore, the systems and methods disclosed herein render a rootkit's defensive mechanisms ineffective, which allows for the successful detection and elimination drivers and/or other components infected with malicious code.

Figure 5:
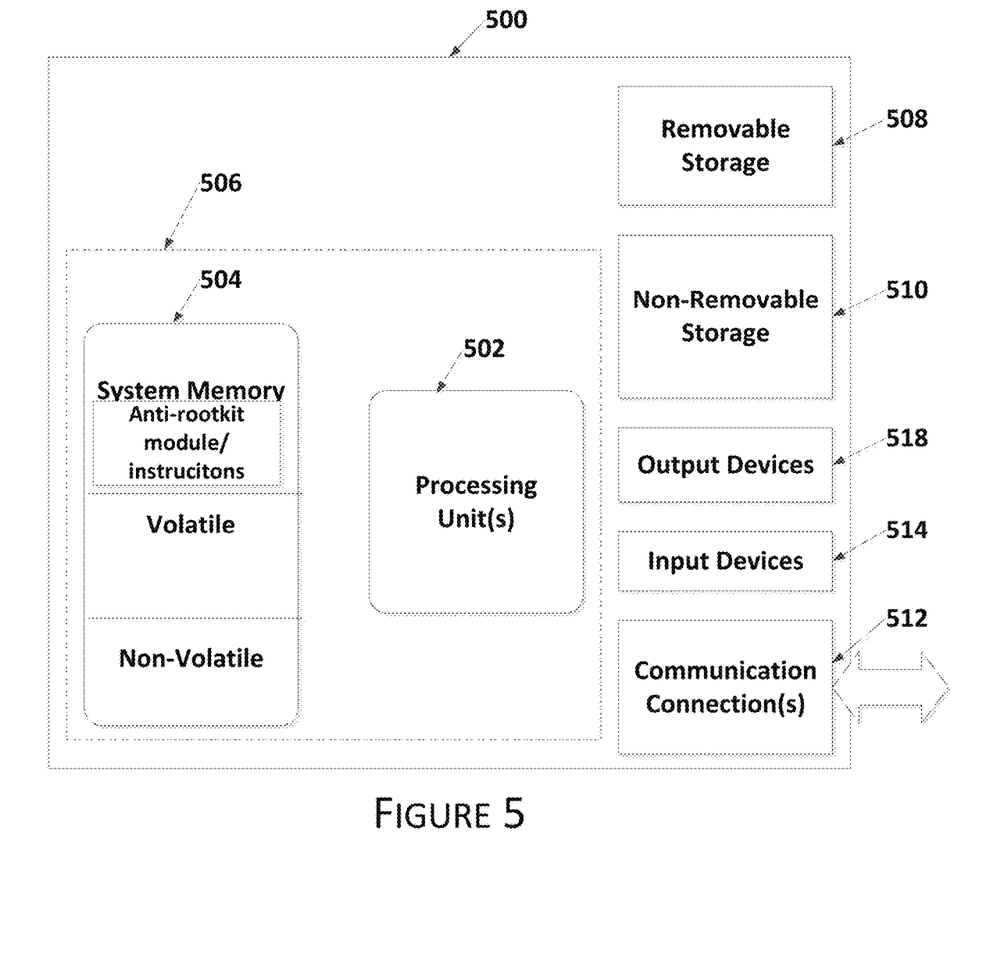
FIG. 5 illustrates one example of a suitable operating environment 500 in which one or more of the present embodiments may be implemented.

FIG. 5 and the additional discussion in the present specification are intended to provide a brief general description of a suitable computing environment in which the present invention and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, anti-rootkit module(s) and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method comprising:
    determining a lowest level driver in a driver chain, wherein the driver chain comprises one or more drivers for communicating with a device;
    locating a trusted copy of the lowest level driver, wherein the trusted copy is not infected by a rootkit;
    establishing an alternate communication path to the device, wherein the alternate communication path includes the trusted copy of the lowest level driver;
    submitting a first request via the alternate communication path;
    receiving a first response to the first request via the alternate communication path; and
    based upon the first response, determining that the driver chain is infected with a rootkit.

2. The method of claim 1, further comprising submitting a second request via a previously established communication path, wherein the previously established communication path comprises the driver chain.

3. The method of claim 2, further comprising receiving a second response to the second request via the previously established communication path.

4. The method of claim 3, wherein determining that the driver chain is infected with a rootkit comprises comparing the first response to the second response.

5. The method of claim 4, further comprising upon identifying a discrepancy between the first response and the second response, performing a countermeasure.

6. The method of claim 5, wherein the countermeasure comprises at least one of:
    redirecting requests to the alternate communication path; and
    deleting the rootkit.

7. The method of claim 5, wherein the countermeasure comprises overwriting a memory location with data from the second response.

8. The method of claim 1, wherein the first request is an input/output (I/O) request.

9. A non-transitory computer storage medium encoding computer executable instructions that, when executed by at least one processor, perform a method comprising:
    determining a lowest level driver in a driver chain, wherein the driver chain comprises one or more drivers for communicating with a device;
    establishing an alternate communication path to the device, wherein the alternate communication path includes a trusted copy of the lowest level driver, wherein the trusted copy is not infected by a rootkit;
    submitting a first input/output (I/O) request via the alternate communication path;
    receiving a first response to the first I/O request via the alternate communication path; and
    based upon the first response, determining that the driver chain is infected with a rootkit.

10. The non-transitory computer storage medium of claim 9, wherein establishing the alternate communication path further comprises:
    identifying one or more additional drivers in the driver chain;
    locating one or more trusted copies of the one or more additional drivers; and
    loading the one or more trusted copies of the one or more additional drivers.

11. The non-transitory computer storage medium of claim 9, wherein the trusted copy of the lowest level driver is loaded in secure memory.

12. The non-transitory computer storage medium of claim 11, wherein the secure memory is not accessible by the rootkit.

13. The non-transitory computer storage medium of claim 9, wherein the method further comprises:
    sending a second request via a previously established communication path, wherein the previously established communication path comprises the driver chain; and
    receiving a second response to the second request via the previously established communication path.

14. The non-transitory computer storage medium of claim 13, wherein determining that the driver chain is infected with a rootkit comprises comparing the first response to the second response.

15. The non-transitory computer storage medium of claim 14, wherein the method further comprises:
    identifying a discrepancy between the first response and the second response; and
    upon identifying the discrepancy, performing a countermeasure.

16. The non-transitory computer storage medium of claim 15, wherein the countermeasure comprises at least one of:
    redirecting requests to the alternate communication path; and
    deleting the rootkit.

17. The non-transitory computer storage medium of claim 15, wherein the countermeasure comprises overwriting a memory location with data from the second response.

18. A system comprising:
    at least one processor; and
    memory encoding computer executable instructions that, when executed by the at least one processor, perform a method comprising:
        determining a lowest level driver in a driver chain, wherein the driver chain comprises one or more drivers for communicating with a device;
        establishing an alternate communication path to the device, wherein the alternate communication path includes a trusted copy of the lowest level driver, wherein the trusted copy is not infected by a rootkit;
        submitting a first input/output (I/O) request via the alternate communication path;
        receiving a first response to the first I/O request via the alternate communication path;
        sending a second I/O request via a previously established communication path, wherein the previously established communication path comprises the driver chain;
        receiving a second response to the second I/O request via the previously established communication path;
        identifying a discrepancy between the first response and the second response; and
        upon identifying the discrepancy, performing a countermeasure.

19. The system of claim 18, wherein the countermeasure comprises at least one of:
    redirecting requests to the alternate communication path; and
    deleting the rootkit.

20. The system of claim 18, wherein the countermeasure comprises overwriting a memory location with data from the second response.

* * * * *